(12) United States Patent
Tomita et al.

(10) Patent No.: US 8,391,112 B2
(45) Date of Patent: Mar. 5, 2013

(54) OPTICAL DISK APPARATUS, CONTROL METHOD, AND PROGRAM

(75) Inventors: Yasushi Tomita, Tokyo (JP); Takamichi Yamakoshi, Tokyo (JP); Kamon Uemura, Tokyo (JP)

(73) Assignee: Sony Corporation, Tokyo (JP)

( * ) Notice: Subject to any disclaimer, the term of this patent is extended or adjusted under 35 U.S.C. 154(b) by 896 days.

(21) Appl. No.: 12/244,365

(22) Filed: Oct. 2, 2008

(65) Prior Publication Data

US 2009/0109811 A1 Apr. 30, 2009

(30) Foreign Application Priority Data

Oct. 25, 2007 (JP) ................................. 2007-278121

(51) Int. Cl.
*G11B 7/00* (2006.01)
(52) U.S. Cl. .................. 369/44.32; 369/53.2; 369/53.19
(58) Field of Classification Search ........................ None
See application file for complete search history.

(56) References Cited

U.S. PATENT DOCUMENTS

| 7,719,940 B2 * | 5/2010 | Ishihara et al. | 369/53.19 |
| 2006/0002253 A1 * | 1/2006 | Ishihara | 369/44.32 |
| 2006/0002254 A1 * | 1/2006 | Ishihara et al. | 369/44.32 |
| 2006/0209621 A1 * | 9/2006 | Andoh et al. | 365/234 |
| 2008/0074973 A1 * | 3/2008 | Nishino | 369/53.15 |
| 2008/0080345 A1 * | 4/2008 | Hasegawa | 369/53.2 |

FOREIGN PATENT DOCUMENTS

| JP | 2002-269763 | 9/2002 |
| JP | 2003-196856 | 7/2003 |
| JP | 2004-95106 | 3/2004 |
| JP | 2005-243201 | 9/2005 |
| JP | 2006-318590 | 11/2006 |
| JP | 2007-95151 | 4/2007 |
| JP | 2007-133967 | 5/2007 |

OTHER PUBLICATIONS

Office Action issued May 26, 2011 in Japanese Patent Application No. 2007-278121.

* cited by examiner

*Primary Examiner* — Van Chow
(74) *Attorney, Agent, or Firm* — Oblon, Spivak, McClelland, Maier & Neustadt, L.L.P.

(57) ABSTRACT

An optical disk apparatus driving an optical disk includes a tilt-angle adjusting unit configured to adjust a tilt angle indicating the tilt of an optical axis of laser light emitted from a pickup to detect an optimal tilt angle at which a traverse signal has the maximum amplitude and a storing unit configured to store information about the optimal tilt angle. When the optical disk has multiple recording layers on one side, the tilt-angle adjusting unit adjusts the tilt angle with respect to each of the multiple recording layers to detect the optimal tilt angle and the storing unit stores information about the optimal tilt angle with respect to each of the multiple recording layers. The tilt angle with respect to each of the multiple recording layers is controlled in accordance with the information about the optimal tilt angle with respect to each of the multiple recording layers.

13 Claims, 8 Drawing Sheets

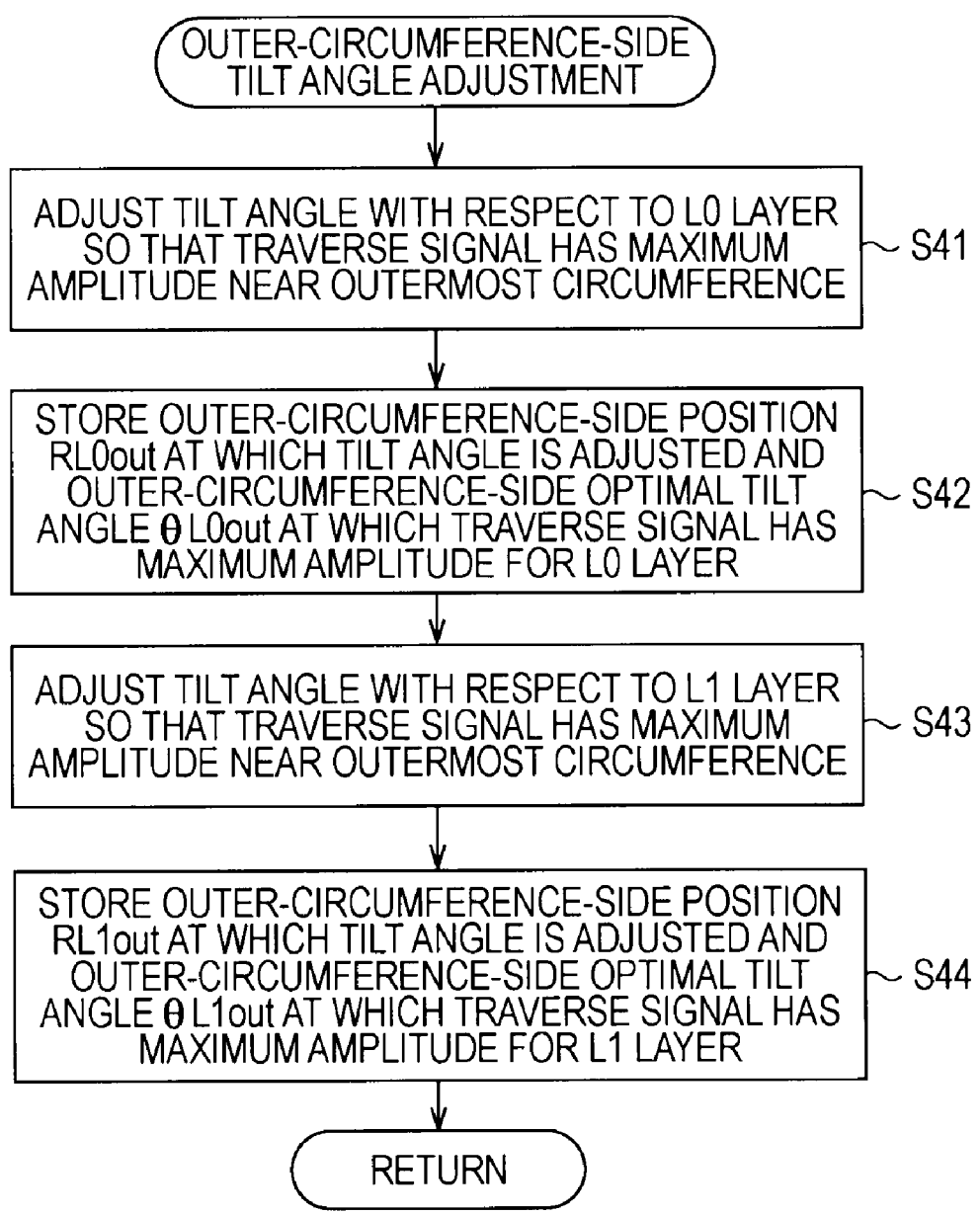

OPTICAL DISK APPARATUS, CONTROL METHOD, AND PROGRAM

CROSS REFERENCES TO RELATED APPLICATIONS

The present invention contains subject matter related to Japanese Patent Application JP 2007-278121 filed in the Japanese Patent Office on Oct. 25, 2007, the entire contents of which are incorporated herein by reference.

BACKGROUND OF THE INVENTION

1. Field of the Invention

The present invention relates to optical disk apparatuses, methods of controlling the apparatuses, and programs. More particularly, the present invention relates to an optical disk apparatus, a method of controlling the optical disk apparatus, and a program capable of rapidly adjusting a tile angle indicating a tilt of the optical axis of a pickup irradiating an optical disk with laser light. The optical disk has multiple, for example, two recording layers on one side.

2. Description of the Related Art

Optical disks that are irradiated with laser light to record and play back data include compact discs (CDs), digital versatile disks (DVDs), and magneto-optical (MO) disks.

High-capacity and high-density optical disks called Blu-ray (Registered trademark) discs (hereinafter also referred to as BDs) have been put to practical use in recent years.

The BDs include Blu-ray discs-Read Only Memory (BD-ROMs) used only for playback, Blu-ray discs-Recordable (BD-Rs) on which data can be recorded only once, and Blu-ray discs-Rewritable (BD-RWs) on which data can be recorded multiple times.

Optical disks having multiple, for example, two recording layers are made practical in order to further increase the recording capacities of the optical disks. Of the two recording layers, a recording layer near the cover layer is called an "L1" layer and a recording layer far from the cover layer is called an "L0" layer.

In such an optical disk apparatus that records data on an optical disk and plays back data on the optical disk, if the optical axis of the (optical) pickup (the optical axis of laser light), which irradiates the optical disk with the laser light and receives reflected light of the laser light to output a radio-frequency (RF) signal etc., does not form an appropriate angle (for example, an angle of 90°) with the recording layer of the optical disk, the spot of the laser light on the recording layer of the optical disk can be distorted to prevent normal playback or recording.

In order to resolve such a problem, the optical disk apparatus performs a startup process to, for example, adjust the tilt angle indicating the tilt of the optical axis of the laser light emitted from the pickup to an optimal tilt angle when, for example, the optical disk is loaded in the optical disk apparatus.

Specifically, in the startup process, the optical disk apparatus adjusts the tilt angle at a position toward the inner circumference of the optical disk to detect an optimal tilt angle toward the inner circumference (an inner-circumference-side optimal tilt angle) and adjusts the tilt angle at a position toward the outer circumference of the optical disk to detect an optimal tilt angle toward the outer circumference (an outer-circumference-side optimal tilt angle).

In recording or playback, the optical disk apparatus calculates the optimal tilt angle at each position in the radial direction of the optical disk by interpolation using the inner-circumference-side optimal tilt angle and the outer-circumference-side optimal tilt angle to control the tilt angle so as to be equal to the optimal tilt angle at the position where the recording or playback is performed on the optical disk.

In other words, the (radial) tilt angle of the objective lens (the tilt of the optical axis of the objective lens) of the pickup is controlled in the optical disk apparatus.

The control described above allows the optical disk apparatus to perform the normal playback or recording even if optical disks that are used are individually varied or the curvature of the optical disks are varied across the ages.

In a typical DVD having the two layers: the "L0" layer and the "L1" layer on one side, the distance from (the surface opposing the pickup of) the cover layer to the "L0" layer is around 0.6 mm and the distance from the cover layer to the "L1" layer is around 90% of the distance from the cover layer to the "L0" layer. Accordingly, the ratio between the distance from the cover layer to the "L0" layer and the distance from the cover layer to the "L1" layer is about 10:9, which is close to 1:1. In other words, the distance to the "L0" layer with respect to the pickup is approximately the same as that to the "L1" layer with respect to the pickup.

In addition, as for the DVD, the numerical aperture (NA) of the objective lens of the pickup is not so high (around 0.6).

For the above reasons, when the pickup forms a certain angle with the DVD (when the optical axis of the pickup forms a certain angle with the recording layer of the optical disk), the spot of the laser light formed on one of the "L0" layer and the "L1" layer has the same shape as the spot of the laser light formed on the other layer.

Consequently, in the DVD having the two layers: the "L0" layer and the "L1" layer on one side, the optimal tilt angle detected by adjusting the tilt angle with respect to only one of the "L0" layer and the "L1" layer can be used for the other layer. Accordingly, it is sufficient to detect the optimal tilt angle with respect to only one of the "L0" layer and the "L1" layer and it is not necessary to detect the optimal tilt angle with respect to the other layer.

However, technologies for adjusting the tilt angle with respect to each of multiple recording layers on a DVD to detect an optimal tilt angle at which an RF signal output from the pickup has the largest amplitude are proposed (for example, refer to Japanese Unexamined Patent Application Publication No. 2007-095151).

The degree of a variation in amplitude of an RF signal with respect to a variation in tilt (in the radial direction) of a typical DVD (hereinafter referred to as a disk tilt sensitivity) coincides with the degree of a variation in amplitude of the RF signal with respect to a variation in tilt (in the radial direction of the optical axis) of the pickup (hereinafter referred to as a lens tilt sensitivity) whereas the disk tilt sensitivity does not coincide with the lens tilt sensitivity in a typical BD.

SUMMARY OF THE INVENTION

In contrast, in a typical BD having the two layers: the "L0" layer and the "L1" layer on one side, the distance from the cover layer to the "L0" layer is around 0.1 mm and the distance from the cover layer to the "L1" layer is around 0.075 mm. Accordingly, the ratio between the distance from the cover layer to the "L0" layer and the distance from the cover layer to the "L1" layer is about 4:3, which is far from 1:1. In other words, the difference between the distance to the "L0" layer with respect to the pickup and the distance to the "L1" layer with respect to the pickup in the BD is larger than that in the DVD.

In addition, as for the BD, the NA of the objective lens of the pickup is rather high (around 0.85).

For the above reasons, when the pickup forms a certain angle with the BD, the spot of the laser light formed on one of the "L0" layer and the "L1" layer is greatly different in shape from that formed on the other layer.

Consequently, in the BD having the two layers: the "L0" layer and the "L1" layer on one side, the tilt angle is adjusted with respect to each of the "L0" layer and the "L1" layer to detect the optimal tilt angle with respect to each layer. In the recording or playback, it is desirable that the tilt angle with respect to the "L0" layer be controlled by using the optimal tilt angle detected for the "L0" layer and the tilt angle with respect to the "L1" layer be controlled by using the optimal tilt angle detected for the "L1" layer in order to perform the normal playback or recording.

However, when the tilt angle is adjusted by using an RF signal as in the case disclosed in Japanese Unexamined Patent Application Publication No. 2007-095151, it is necessary to record data on the optical disk. When no data is recorded on the optical disk, it is necessary to adjust the tilt angle to detect the optimal tilt angle after so-called trial-writing of data is performed and, therefore, it takes a time to adjust the tilt angle.

It is desirable to rapidly adjust the tilt angle with respect to an optical disk having multiple recording layers on one side.

According to an embodiment of the present invention, an optical disk apparatus driving an optical disk includes tilt-angle adjusting means for adjusting a tilt angle indicating the tilt of an optical axis of laser light emitted from a pickup to detect an optimal tilt angle at which a traverse signal has the maximum amplitude and storing means for storing information about the optimal tilt angle. The pickup irradiates the optical disk with the laser light and outputs a radio-frequency signal and a tracking error signal depending on reflected light of the laser light reflected from the optical disk. The traverse signal is the tracking error signal when tracking control is inactivated. When the optical disk has a plurality of recording layers on one side, the tilt-angle adjusting means adjusts the tilt angle with respect to each of the plurality of recording layers to detect the optimal tilt angle and the storing means stores information about the optimal tilt angle with respect to each of the plurality of recording layers. The tilt angle with respect to each of the plurality of recording layers is controlled in accordance with the information about the optimal tilt angle with respect to each of the plurality of recording layers stored in the storing means.

According to another embodiment of the present invention, a method of controlling an optical disk apparatus that drives an optical disk includes the steps of adjusting a tilt angle indicating the tilt of an optical axis of laser light emitted from a pickup to detect an optimal tilt angle at which a traverse signal has the maximum amplitude and storing information about the optimal tilt angle in storing means. The pickup irradiates the optical disk with the laser light and outputs a radio-frequency signal and a tracking error signal depending on reflected light of the laser light reflected from the optical disk. The traverse signal is the tracking error signal when tracking control is inactivated. When the optical disk has a plurality of recording layers on one side, the adjusting adjusts the tilt angle with respect to each of the plurality of recording layers to detect the optimal tilt angle and the storing stores information about the optimal tilt angle with respect to each of the plurality of recording layers in the storing means. The tilt angle with respect to each of the plurality of recording layers is controlled in accordance with the information about the optimal tilt angle with respect to each of the plurality of recording layers stored in the storing means.

According to another embodiment of the present invention, a computer-executable program to control an optical disk apparatus driving an optical disk includes tilt-angle adjusting means for adjusting a tilt angle indicating the tilt of an optical axis of laser light emitted from a pickup to detect an optimal tilt angle at which a traverse signal has the maximum amplitude and storing means for storing information about the optimal tilt angle. The pickup irradiates the optical disk with the laser light and outputs a radio-frequency signal and a tracking error signal depending on reflected light of the laser light reflected from the optical disk. The traverse signal is the tracking error signal when tracking control is inactivated. When the optical disk has a plurality of recording layers on one side, the tilt-angle adjusting means adjusts the tilt angle with respect to each of the plurality of recording layers to detect the optimal tilt angle and the storing means stores information about the optimal tilt angle with respect to each of the plurality of recording layers. The tilt angle with respect to each of the plurality of recording layers is controlled in accordance with the information about the optimal tilt angle with respect to each of the plurality of recording layers stored in the storing means.

In the optical disk apparatus driving the optical disk, the method of controlling the optical disk apparatus, and the computer-executable program to control the optical disk apparatus, the tilt angle indicating the tilt of the optical axis of the laser light emitted from the pickup is adjusted to detect the optimal tilt angle at which the traverse signal has the maximum amplitude and the information about the optimal tilt angle is stored. The pickup irradiates the optical disk with the laser light and outputs the radio-frequency signal and the tracking error signal depending on the reflected light of the laser light reflected from the optical disk. The traverse signal is the tracking error signal when the tracking control is inactivated. When the optical disk has a plurality of recording layers on one side, the tilt angle with respect to each of the plurality of recording layers is adjusted to detect the optimal tilt angle and the information about the optimal tilt angle with respect to each of the plurality of recording layers is stored. The tilt angle with respect to each of the plurality of recording layers is controlled in accordance with the information about the optimal tilt angle with respect to each of the plurality of recording layers that are stored.

The program may be transmitted through a transmission medium or may be recorded in a recording medium.

The optical disk apparatus may be an independent apparatus or may be an internal block in one apparatus.

According to the present invention, it is possible to rapidly adjust the tilt angle with respect to the optical disk having multiple recording layers on one side.

BRIEF DESCRIPTION OF THE DRAWINGS

FIG. 7 is a flowchart showing an example of an outer-circumference-side tilt angle adjustment process.

DESCRIPTION OF THE PREFERRED EMBODIMENTS

Figure 1:
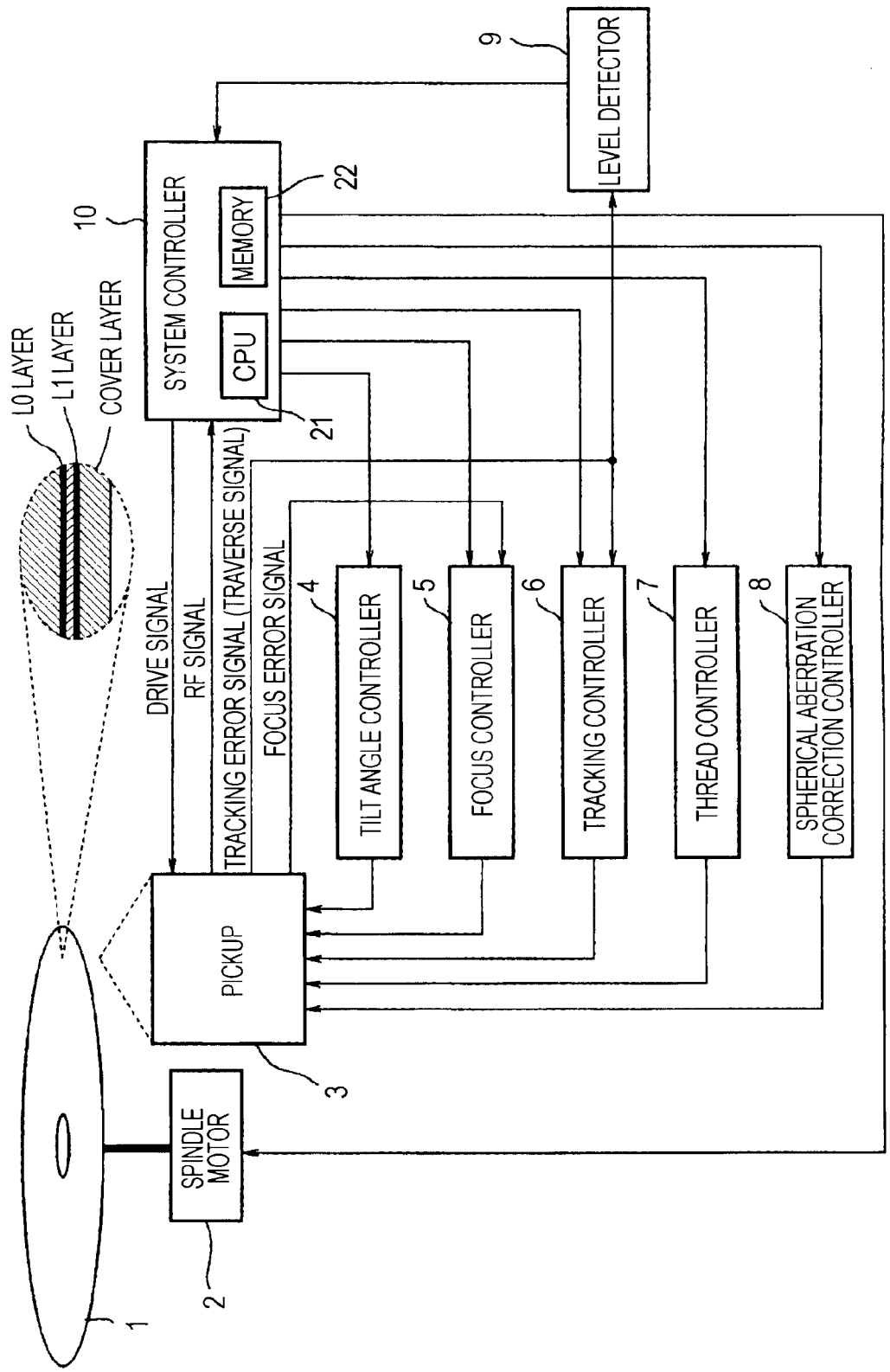
FIG. 1 is a block diagram showing an example of the configuration of an optical disk apparatus according to an embodiment of the present invention.

FIG. 1 is a block diagram showing an example of the configuration of an optical disk apparatus according to an embodiment of the present invention.

Referring to FIG. 1, an optical disk 1 has multiple recording layers on one side and is, for example, a BD having two layers: an "L0" layer and an "L1" layer on one side (hereinafter also simply referred to as a two-layer BD) The optical disk 1 is removable from the optical disk apparatus.

The optical disk apparatus shown in FIG. 1 is capable of playing back data on optical disks of multiple types and recording data thereon. Accordingly, the optical disk 1 may be a BD, DVD, CD, or another disk having one layer, instead of the BD having the two recording layers: the "L0" layer and the "L1" layer on one side.

A spindle motor 2 rotates the optical disk 1 loaded in the optical disk apparatus under the control of a system controller 10.

A pickup 3 irradiates the optical disk 1 with laser light in accordance with a drive signal supplied from the system controller 10. In addition, the pickup 3 receives reflected light of the laser light reflected from the optical disk 1 to output an RF signal, a tracking error signal, and a focus error signal in accordance with the reflected light. The RF signal corresponds to data recorded on the optical disk 1. The tracking error signal corresponds to the amount of shift of the position of the spot of the laser light with which the optical disk 1 is irradiated with respect to the track of the optical disk 1. The focus error signal corresponds to the amount of shift of the focus of the laser light with which the optical disk 1 is irradiated.

The RF signal output from the pickup 3 is supplied to the system controller 10. The tracking error signal output from the pickup 3 is supplied to a tracking controller 6 and a level detector 9. The focus error signal output from the pickup 3 is supplied to a focus controller 5.

A tilt angle controller 4 performs tilt angle control to control the tilt angle of the pickup 3 under the control of the system controller 10. Specifically, the tilt angle controller 4 controls the orientation of the objective lens of the pickup 3 to vary the relative tilt of (the laser light emitted from) the pickup 3 with respect to the optical disk 1.

The focus controller 5 uses the focus error signal supplied from the pickup 3 as a focus control signal used for controlling the focus to correct the focus control signal by using a focus bias supplied from the system controller 10 (for example, to add the focus bias to the focus control signal).

In addition, the focus controller 5 performs focus control to vertically move (the position of the focus of the laser light emitted from) the pickup 3 with respect to the optical disk 1 so as to decrease the level of the focus error signal under the control of the pickup 3 on the basis of the focus control signal subjected to the correction.

The tracking controller 6 performs tracking control to vertically move (the position of the spot of the laser light emitted from) the pickup 3 with respect to the track of the optical disk 1 so as to decrease the level of the tracking error signal under the control of the system controller 10 on the basis of the tracking error signal supplied from the pickup 3.

A thread controller 7 performs thread control to move the pickup 3 in the radial direction of the optical disk 1 under the control of the system controller 10.

A spherical aberration correction controller 8 performs spherical aberration correction control in which an aberration correction value used for correcting the spherical aberration of the pickup 3 is supplied to the pickup 3 to correct the spherical aberration of the pickup 3 under the control of the system controller 10.

In order to correct the spherical aberration, for example, an expander lens is provided between a diode or the like emitting the laser light and the objective lens for condensing the laser light on the optical disk 1 in the pickup and the expander lens is moved in a direction parallel to the optical axis of the laser light by, for example, a stepping motor. The expander lens is capable of moving in a direction parallel to the optical axis of the laser light and is used for correcting the spherical aberration. In this case, the aberration correction value corresponds to a drive signal used for driving the stepping motor that moves the expander lens.

The level detector 9 detects the amplitude (level) of the tracking error signal supplied from the pickup 3 and supplies the detected amplitude to the system controller 10.

The system controller 10 includes a central processing unit (CPU) 21 and a memory 22. In the system controller 10, the CPU 21 executes programs stored in the memory 22 to perform a variety of processing.

Specifically, the system controller 10 supplies the drive signal to the pickup 3 in accordance with data to be recorded on the optical disk 1 to cause the pickup 3 to irradiate the optical disk 1 with the laser light in order to record the data on the optical disk 1.

In addition, the system controller 10 performs necessary processing to the RF signal supplied from the pickup 3 and outputs the data that results from the processing and that is recorded on the optical disk 1.

Furthermore, the system controller 10 controls the spindle motor 2, the tilt angle controller 4, the focus controller 5, the tracking controller 6, the thread controller 7, and the spherical aberration correction controller 8 in accordance with the RF signal supplied from the pickup 3 and the amplitude etc. of the tracking error signal supplied from the level detector 9.

The programs executed by the CPU 21 in the system controller 10 may be recorded on a removable recording medium, such as a flexible disk, a compact disk-read only memory (CD-ROM), an MO disk, a DVD, a magnetic disk, or a semi-conductor memory, to be installed in the memory 22 from the removable recording medium, instead of being installed in advance in the memory 22.

Alternatively, the programs may be downloaded from a download site over a network, such as the Internet to be installed in the memory 22.

In the optical disk apparatus having the above configuration, the optical disk 1 is rotated by the spindle motor 2, the tilt angle control is performed by the tilt angle controller 4, the focus control is performed by the focus controller 5, the tracking control is performed by the tracking controller 6, the thread control is performed by the thread controller 7, and the spherical aberration correction control is performed by the spherical aberration correction controller 8.

In recording of data, the system controller 10 supplies the drive signal to the pickup 3 in accordance with the data to be recorded on the optical disk 1 and the pickup 3 irradiates the optical disk 1 with laser light in accordance with the drive signal supplied from the system controller 10. As a result, the data is recorded on the optical disk 1.

In playback of data, the system controller 10 supplies the drive signal to the pickup 3 and the pickup 3 irradiates the optical disk 1 with laser light in accordance with the drive signal supplied from the system controller 10.

The pickup 3 receives reflected light of the laser light reflected from the optical disk 1 and supplies the RF signal corresponding to data recorded on the optical disk 1 to the system controller 10 in accordance with the reflected light. The system controller 10 performs necessary processing to the RF signal supplied from the pickup 3 and outputs the data that results from the processing and that is recorded on the optical disk 1.

If the optical axis of the pickup (the optical axis of the laser light) does not form an appropriate angle with the recording layer of the optical disk in the optical disk 1 shown in FIG. 1, the spot of the laser light on the recording layer of the optical disk can be distorted to prevent the normal playback or recording.

In order to resolve such a problem, the optical disk apparatus performs a startup process to adjust the tilt angle of the pickup 3 to an optimal tilt angle when, for example, the optical disk 1 is loaded in the optical disk apparatus.

Specifically, in the startup process, the optical disk apparatus adjusts the tilt angle at a position toward the inner circumference of the optical disk 1 to detect an optimal tilt angle toward the inner circumference (an inner-circumference-side optimal tilt angle) and adjusts the tilt angle at a position toward the outer circumference of the optical disk 1 to detect an optimal tilt angle toward the outer circumference (an outer-circumference-side optimal tilt angle).

In the recording or playback of data by the optical disk apparatus, the system controller 10 calculates the optimal tilt angle at each position in the radial direction of the optical disk 1 by interpolation using the inner-circumference-side optimal tilt angle and the outer-circumference-side optimal tilt angle and the tilt angle controller 4 controls the tilt angle so as to be equal to the optimal tilt angle at the position where the recording or playback is performed on the optical disk 1.

Figure 2:
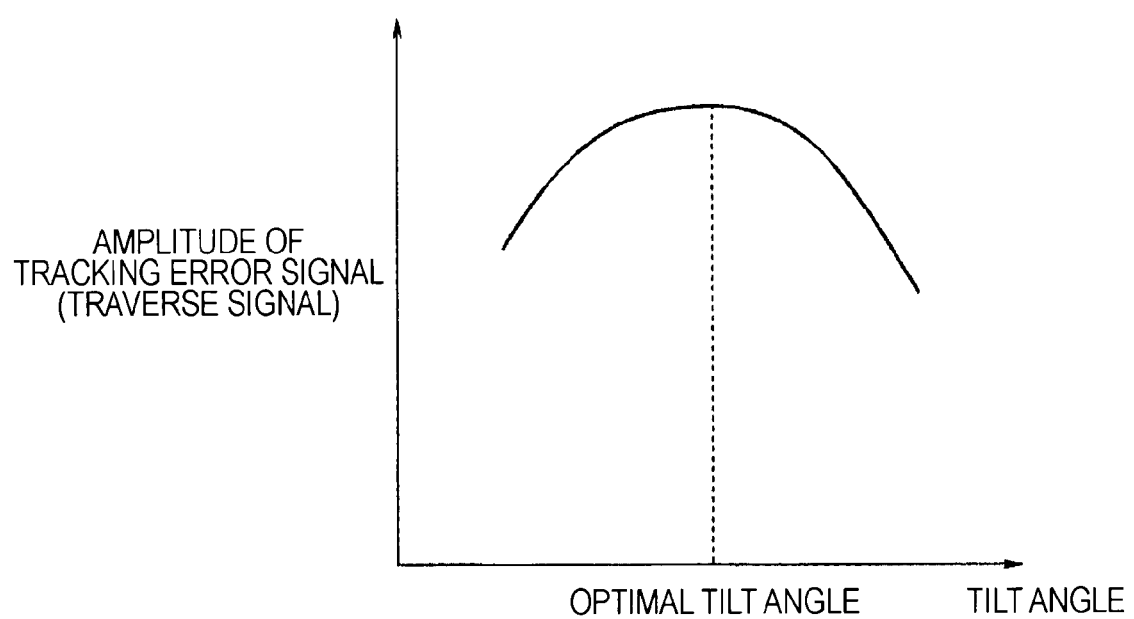
FIG. 2 is a diagram showing the relationship between a tilt angle and the amplitude of a traverse signal.

FIG. 2 is a diagram for description of how to detect the optimal tilt angle.

The relationship between the tilt angle (skew) of the pickup 3 and the amplitude of a traverse signal is shown in FIG. 2. The traverse signal is the tracking error signal when the tracking control is in an OFF state (the tracking control is inactivated).

The amplitude of the traverse signal is maximized when the tilt angle of the pickup 3 is equal to the optimal tilt angle and is decreased as the tilt angle of the pickup 3 is shifted from the optimal tilt angle.

In the startup process in the optical disk apparatus shown in FIG. 1, the system controller 10 adjusts the tilt angle of the pickup 3 to detect the tilt angle at which the amplitude of the traverse signal supplied from the level detector 9, that is, the amplitude of the tracking error signal when the tracking control is in the OFF state is maximized as the optimal tilt angle.

When the optimal tilt angle is detected by using the traverse signal in the manner described above, the tilt angle can be rapidly adjusted to detect the optimal tilt angle regardless of whether data is recorded on the optical disk 1 because data is not necessarily recorded on the optical disk 1, unlike the above case where the RF signal is used to detect the optimal tilt angle. As a result, the startup process can be performed in a short time.

Figure 3:
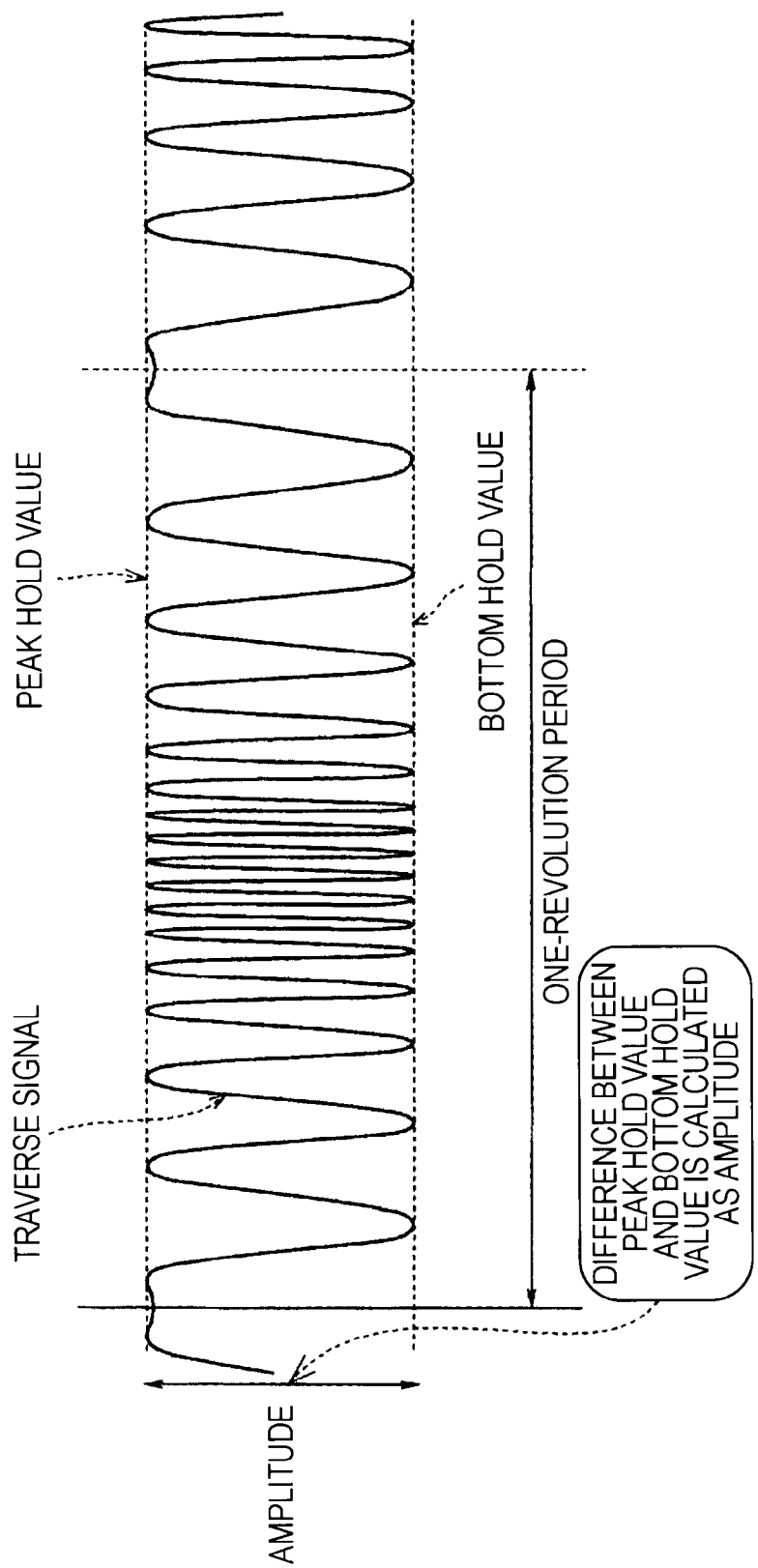
FIG. 3 shows an example of the waveform of a traverse signal.

FIG. 3 shows an example of the waveform of a traverse signal.

The traverse signal is the tracking error signal when the tracking control is in the OFF state. When the tracking control is in the OFF state, the position on the optical disk 1 which is irradiated with the laser light emitted from the pickup 3 (the position of the spot of the laser light) is shifted so as to periodically traverse multiple tracks due to eccentricity etc. of the optical disk 1 even if the pickup 3 is fixed.

Accordingly, the traverse signal is periodically varied in the manner shown in FIG. 3.

In the optical disk apparatus shown in FIG. 1, the level detector 9 calculates the difference between a peak hold value, which is the maximum value of the traverse signal as shown in FIG. 3, and a bottom hold value, which is the minimum value thereof, as the amplitude of the traverse signal and supplies the calculated amplitude of the traverse signal to the system controller 10.

Figure 4:
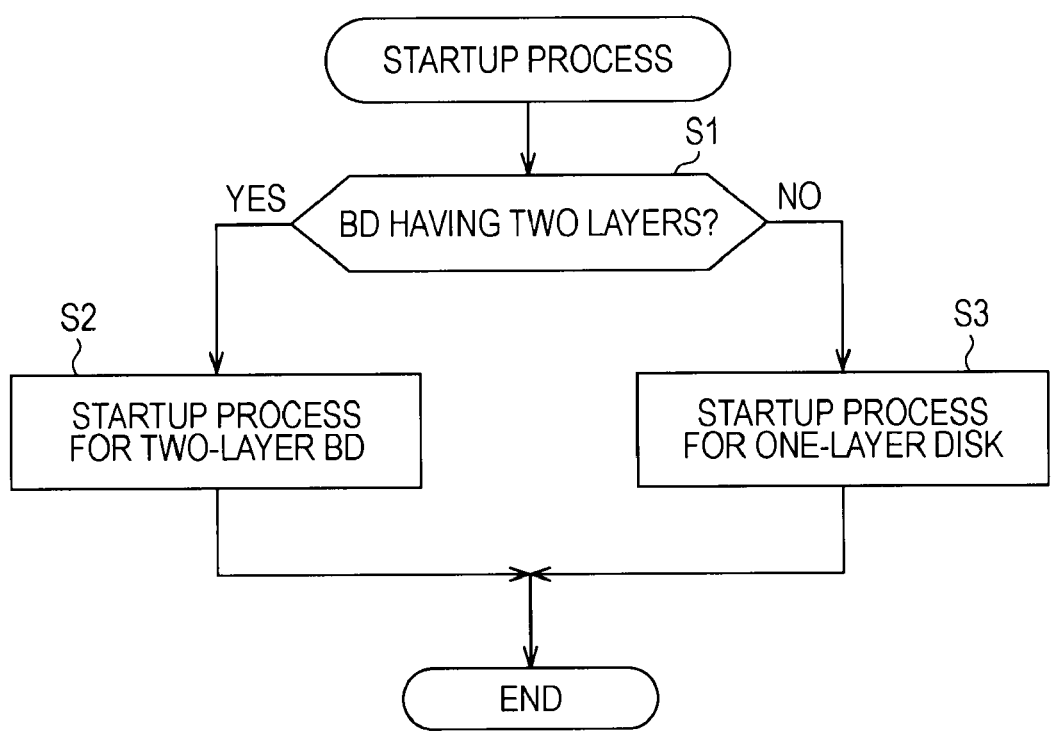
FIG. 4 is a flowchart showing an example of a startup process.

FIG. 4 is a flowchart showing an example of the startup process performed in the optical disk apparatus shown in FIG. 1.

The startup process is started when, for example, the optical disk 1 is loaded in the optical disk apparatus, as described above.

In the startup process, in Step S1, (the CPU 21 in) the system controller 10 determines the type of the optical disk 1 loaded in the optical disk apparatus.

The type of the optical disk 1 can be determined by irradiating the optical disk 1 with laser light and processing the signal corresponding to reflected light of the laser light reflected from the optical disk 1.

If the system controller 10 determines in Step S1 that the optical disk 1 is a two-layer BD, that is, if the optical disk 1 is an optical disk on which the distance to the "L0" layer with respect to the pickup 3 does not coincide with the distance to the "L1" layer with respect to the pickup 3, the process goes to Step S2 to perform a startup process for a two-layer BD and is terminated.

If the system controller 10 determines in Step S1 that the optical disk 1 is not a two-layer BD, that is, if the optical disk 1 is a BD or DVD having only one layer or is a two-layer DVD which has the two layers: the "L0" layer and the "L1" layer and on which the distance to the "L0" layer with respect to the pickup 3 coincides with the distance to the "L1" layer with respect to the pickup 3, the process goes to Step S3 to perform a startup process for a one-layer disk and is terminated.

The startup process for a two-layer BD described in detail below is performed for each of the two layers: the "L0" layer and the "L1" layer of the two-layer BD.

The startup process for a one-layer disk is performed in a manner similar to that of the startup process for a two-layer BD, except that the startup process for a one-layer disk is targeted at one recording layer (the one recording layer when the optical disk 1 has one recording layer and one of the recording layers when the optical disk 1 has two (or more) recording layers).

Figure 5:
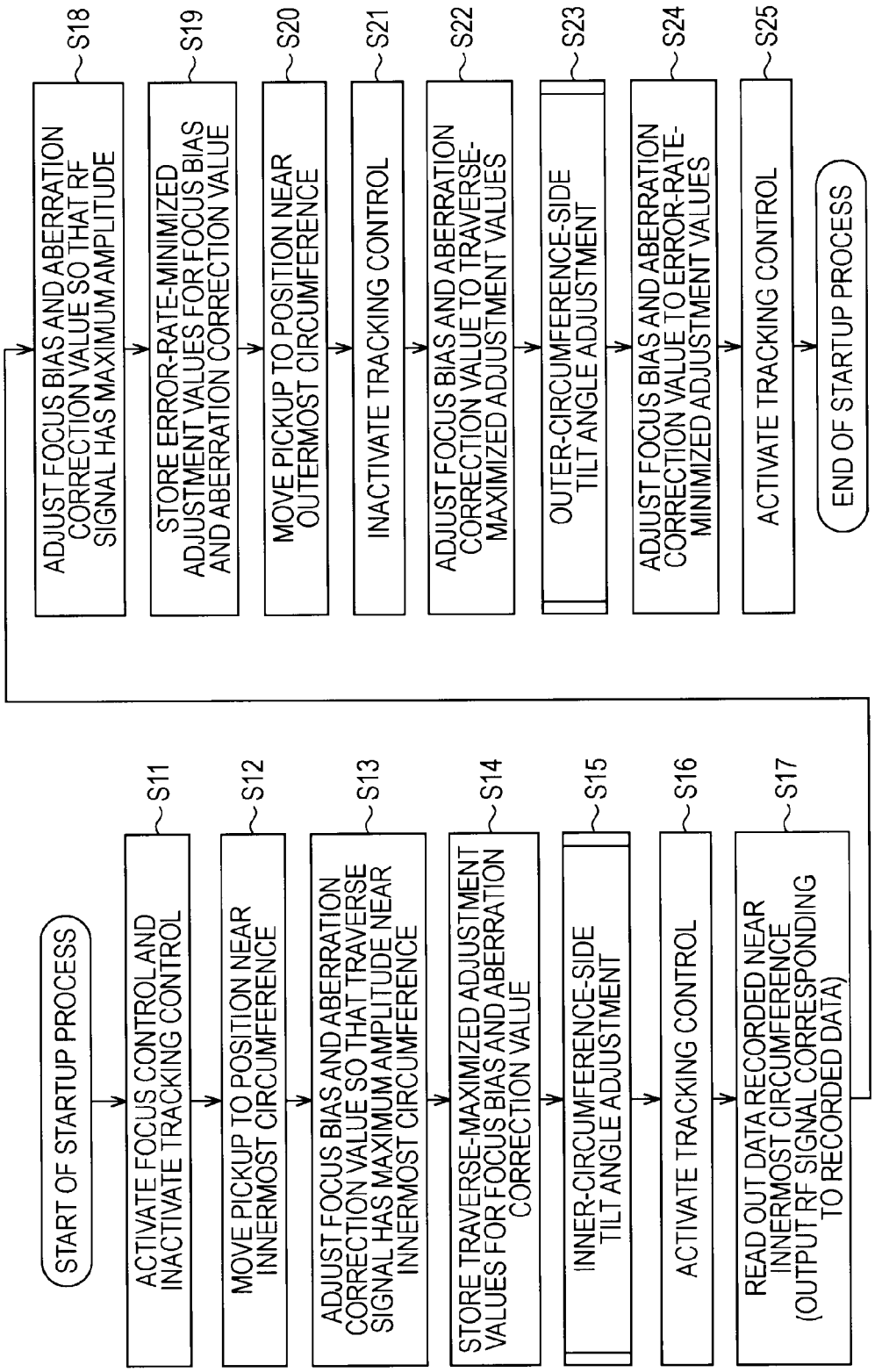
FIG. 5 is a flowchart showing an example of the startup process for a two-layer BD.

FIG. 5 is a flowchart showing an example of the startup process for a two-layer BD in Step S2 in FIG. 4.

In the startup process for a two-layer BD, in Step S11, the system controller 10 controls the focus controller 5 so as to be in an ON state (to activate the focus control) and controls the tracking controller 6 so as to be in the OFF state (to inactivate the tracking control).

In Step S12, the system controller 10 controls the thread controller 7 so as to move the pickup 3 to a position near the innermost circumference of the optical disk 1.

In Step S13, the system controller 10 adjusts the focus bias and the aberration correction value so as to maximize the amplitude of the traverse signal supplied from the level detector 9.

Specifically, in Step S13, the system controller 10 adjusts the focus bias to multiple values and supplies the multiple values of the focus bias to the focus controller 5 to cause the focus controller 5 to perform the focus control by using the multiple values of the focus bias.

Furthermore, in the focus control by using the multiple values of the focus bias, the system controller 10 refers to the amplitude of the traverse signal supplied from the level detector 9 to determine the value of the focus bias at which the amplitude of the traverse signal is maximized to be a traverse-maximized adjustment value.

Similarly, the system controller 10 adjusts the aberration correction value to multiple values and supplies the multiple aberration correction values to the spherical aberration correction controller 8 to cause the spherical aberration correction controller 8 to perform the spherical aberration correction control by using the multiple aberration correction values.

Furthermore, in the spherical aberration correction control by using the multiple aberration correction values, the system controller 10 refers to the amplitude of the traverse signal supplied from the level detector 9 to determine the aberration correction value at which the amplitude of the traverse signal is maximized to be a traverse-maximized adjustment value.

The system controller 10 supplies the traverse-maximized adjustment value for the focus bias and the traverse-maximized adjustment value for the aberration correction value to the focus controller 5 and the spherical aberration correction controller 8, respectively. The focus controller 5 performs the focus control by using the traverse-maximized adjustment value for the focus bias and the spherical aberration correction controller 8 performs the spherical aberration correction control by using the traverse-maximized adjustment value for the aberration correction value.

In Step S14, the system controller 10 stores the traverse-maximized adjustment values for the focus bias and the aberration correction value determined in Step S13, that is, the focus bias and the aberration correction value at which the amplitude of the traverse signal is maximized in the memory 22 (FIG. 1).

In Step S15, the system controller 10 adjusts the tilt angle of the pickup 3 to the multiple values near the innermost circumference of the optical disk 1 and performs an inner-circumference-side tilt angle adjustment process in which an inner-circumference-side optimal tilt angle at which the traverse signal supplied from the level detector 9 has the maximum amplitude is detected and stored.

At this time, the focus bias and the aberration correction value have been adjusted to the traverse-maximized adjustment values in Step S13. Accordingly, the inner-circumference-side tilt angle adjustment process in Step S15 is performed in a state where the focus bias and the aberration correction value are set to the traverse-maximized adjustment values.

The amplitude of the traverse signal with respect to the tilt angle of the pickup 3 is maximized when the tilt angle is equal to the optimal tilt angle and is decreased as the tilt angle is shifted from the optimal tilt angle, as shown in FIG. 2. In other words, the traverse signal has convex-shaped amplitude.

The convex-shaped amplitude of the traverse signal with respect to the tilt angle becomes steeper as the adjustment levels of the focus bias and the aberration correction value to increase the amplitude of the traverse signal are increased.

Accordingly, adjusting the focus bias and the aberration correction value to the traverse-maximized adjustment values to perform the inner-circumference-side tilt angle adjustment process allows the tilt angle at which the traverse signal has the maximum amplitude (the inner-circumference-side optimal tilt angle) to be accurately detected.

In Step S16, the system controller 10 controls the tracking controller 6 so as to activate the tracking control. As a result, both the focus control and the tracking control are in the ON state.

In Step S17, the system controller 10 supplies the drive signal to the pickup 3 to read out data recorded near the innermost circumference of the optical disk 1, that is, to read out management data and other recoded data recorded on tracks toward the inner circumference of the optical disk 1.

The pickup 3 irradiates the optical disk 1 with laser light in accordance with the drive signal supplied from the system controller 10, receives reflected light of the laser light, and supplies an RF signal corresponding to the reflected light to the system controller 10.

When the RF signal corresponding to the data recorded on the optical disk 1 has been supplied from the pickup 3 to the system controller 10 in the above manner, then in Step S18, the system controller 10 adjusts the focus bias and the aberration correction value so that the data corresponding to the RF signal supplied from the pickup 3 has the minimum error rate.

Specifically, in Step S18, the system controller 10 adjusts the focus bias to multiple values and supplies the multiple values of the focus bias to the focus controller 5 to cause the focus controller 5 to perform the focus control by using the multiple values of the focus bias.

In addition, in the focus control by using the multiple values of the focus bias, the system controller 10 determines the value of the focus bias at which the data corresponding to the RF signal supplied from the pickup 3 has the minimum error rate, for example, the value of the focus bias at which the RF signal has the maximum amplitude to be an error-rate-minimized adjustment value.

Similarly, the system controller 10 adjusts the aberration correction value to multiple values and supplies the multiple aberration correction values to the spherical aberration correction controller 8 to cause the spherical aberration correction controller 8 to perform spherical aberration correction control by using the multiple aberration correction values.

In addition, in the spherical aberration correction control by using the multiple aberration correction values, the system controller 10 determines the aberration correction value at which the data corresponding to the RF signal supplied from the pickup 3 has the minimum error rate, for example, the aberration correction value at which the RF signal has the maximum amplitude to be an error-rate-minimized adjustment value.

In Step S19, the system controller 10 stores the error-rate-minimized adjustment values for the focus bias and the aberration correction value determined in Step S18, that is, the focus bias and the aberration correction value at which the error rate of the data read out from the optical disk 1 is minimized in the memory 22 (FIG. 1).

In Step S20, the system controller 10 controls the thread controller 7 so as to move the pickup 3 to a position near the outermost circumference of the optical disk 1.

In Step S21, the system controller 10 controls the tracking controller 6 so as to inactivate the tracking control. As a result, the tracking error signal output from the pickup 3 becomes the tracking error signal when the focus control is in the OFF state, that is, the traverse signal.

In Step S22, the system controller 10 adjusts the focus bias and the aberration correction value to the traverse-maximized adjustment values stored in the memory 22 in Step S14 and supplies the adjusted focus bias and aberration correction value to the focus controller 5 and the spherical aberration correction controller 8, respectively.

The focus controller 5 performs the focus control by using the traverse-maximized adjustment value for the focus bias and the spherical aberration correction controller 8 performs the spherical aberration correction control by using the traverse-maximized adjustment value for the aberration correction value.

In Step S23, the system controller 10 adjusts the tilt angle of the pickup 3 to the multiple values near the outermost circumference of the optical disk 1 and performs an outer-circumference-side tilt angle adjustment process in which an outer-circumference-side optimal tilt angle at which the traverse signal supplied from the level detector 9 has the maximum amplitude is detected and stored.

At this time, the focus bias and the aberration correction value have been adjusted to the traverse-maximized adjustment values in Step S22. Accordingly, the outer-circumference-side tilt angle adjustment process in Step S22 is performed in the state where the focus bias and the aberration correction value are set to the traverse-maximized adjustment values, as in the inner-circumference-side tilt angle adjustment process in Step S15.

Accordingly, also in the outer-circumference-side tilt angle adjustment process, as in the inner-circumference-side tilt angle adjustment process, the tilt angle at which the traverse signal has the maximum amplitude (the outer-circumference-side optimal tilt angle) can be accurately detected.

In Step S24, the system controller 10 adjusts the focus bias and the aberration correction value to the error-rate-minimized adjustment values stored in the memory 22 in Step S19 and supplies the adjusted focus bias and aberration correction value to the focus controller 5 and the spherical aberration correction controller 8, respectively.

The focus controller 5 performs the focus control by using the error-rate-minimized adjustment value for the focus bias and the spherical aberration correction controller 8 performs the spherical aberration correction control by using the error-rate-minimized adjustment value for the aberration correction value.

In Step S25, the system controller 10 controls the tracking controller 6 so as to activate the tracking control. As a result, both the focus control and the tracking control are in the ON state and the startup process is terminated.

Subsequently, data is recorded on the optical disk 1 or data on the optical disk 1 is played back, if necessary, in the state where the focus control using the error-rate-minimized adjustment value for the focus bias and the spherical aberration correction control using the error-rate-minimized adjustment value for the aberration correction value are performed.

As described above, in the startup process in the optical disk apparatus, the focus bias and the aberration correction value are adjusted to the traverse-maximized adjustment values at which the amplitude of the traverse signal is maximized at a position toward the inner circumference of the optical disk 1 to store the adjusted focus bias and aberration correction value in the memory 22, the inner-circumference-side tilt angle adjustment process is performed at the position toward the inner circumference of the optical disk 1, in which the tilt angle is adjusted to detect the inner-circumference-side optimal tilt angle and store the detected inner-circumference-side optimal tilt angle in the memory 22, and the focus bias and the aberration correction value are adjusted to the error-rate-minimized adjustment values at which the error rate of the data corresponding to the RF signal supplied from the pickup 3 is minimized at the position toward the inner circumference of the optical disk 1 to store the adjusted focus bias and aberration correction value in the memory 22. After the pickup 3 is moved to a position toward the outer circumference of the optical disk 1, the focus bias and the aberration correction value are adjusted to the traverse-maximized adjustment values stored in the memory 22 at the position toward the outer circumference of the optical disk 1, the outer-circumference-side tilt angle adjustment process is performed at the position toward the outer circumference of the optical disk 1, in which the tilt angle is adjusted to detect the outer-circumference-side optimal tilt angle and store the detected outer-circumference-side optimal tilt angle in the memory 22, and the focus bias and the aberration correction value are adjusted to the error-rate-minimized adjustment values at the position toward the outer circumference of the optical disk 1. Accordingly, it is possible to rapidly perform the startup process to adjust the tilt angle.

In other words, the traverse-maximized adjustment values for the focus bias and the aberration correction value (the focus bias and the aberration correction value at which the amplitude of the traverse signal is maximized) do not coincide with the error-rate-minimized adjustment values for the focus bias and the aberration correction value (the focus bias and the aberration correction value at which the error rate of the data read out from the optical disk 1 is minimized).

In addition, it is desirable that the inner-circumference-side tilt angle adjustment process and the outer-circumference-side tilt angle adjustment process be performed in the state where the focus bias and the aberration correction value are adjusted to the traverse-maximized adjustment values at which the amplitude of the traverse signal is maximized in order to accurately detect the optimal tilt angle.

In contrast, it is desirable that the recording of data on the optical disk 1 and playback of data on the optical disk 1 be performed in the state where the focus bias and the aberration correction value are adjusted to the error-rate-minimized adjustment values at which the amplitude of the RF signal is maximized in order to reduce the error rate of the data.

Accordingly, in view of the adjustment of the focus bias and the aberration correction value, for example, the startup process may be performed in an order in which the focus bias and the aberration correction value are adjusted to the traverse-maximized adjustment values at a position toward the inner circumference of the optical disk 1, the inner-circumference-side tilt angle adjustment process is performed at the position toward the inner circumference of the optical disk 1, the outer-circumference-side tilt angle adjustment process is performed at a position toward the outer circumference of the optical disk 1, and the focus bias and the aberration correction value are adjusted to the error-rate-minimized adjustment values at which the amplitude of the RF signal is maximized at the position toward the inner circumference of the optical disk 1 by using the RF signal corresponding to the data toward the inner circumference of the optical disk 1.

However, in the above case, it is necessary to perform seek toward the inner circumference of the optical disk 1 to perform the inner-circumference-side tilt angle adjustment process, to perform the seek toward the outer circumference of the optical disk 1 to perform the outer-circumference-side tilt angle adjustment process, and to perform the seek again toward the inner circumference of the optical disk 1.

In contrast, when the focus bias and the aberration correction value are adjusted to the traverse-maximized adjustment values at a position toward the inner circumference of the optical disk 1 to store the adjusted focus bias and aberration correction value in the memory 22; the inner-circumference-side tilt angle adjustment process is performed; the focus bias and the aberration correction value are adjusted to the error-rate-minimized adjustment values by using the RF signal corresponding to the data toward the inner circumference of the optical disk 1 at the position toward the inner circumference of the optical disk 1 to store the adjusted focus bias and aberration correction value in the memory 22; the focus bias and the aberration correction value are adjusted to the traverse-maximized adjustment values stored in the memory 22 at a position toward the outer circumference of the optical disk 1; the outer-circumference-side tilt angle adjustment process is performed; and the focus bias and the aberration correction value are adjusted to the error-rate-minimized adjustment values stored in the memory 22, as described above with reference to FIG. 5, the number of times of seek in the startup process is reduced and, therefore, it is possible to reduce the time necessary to perform the startup process.

Figure 6:
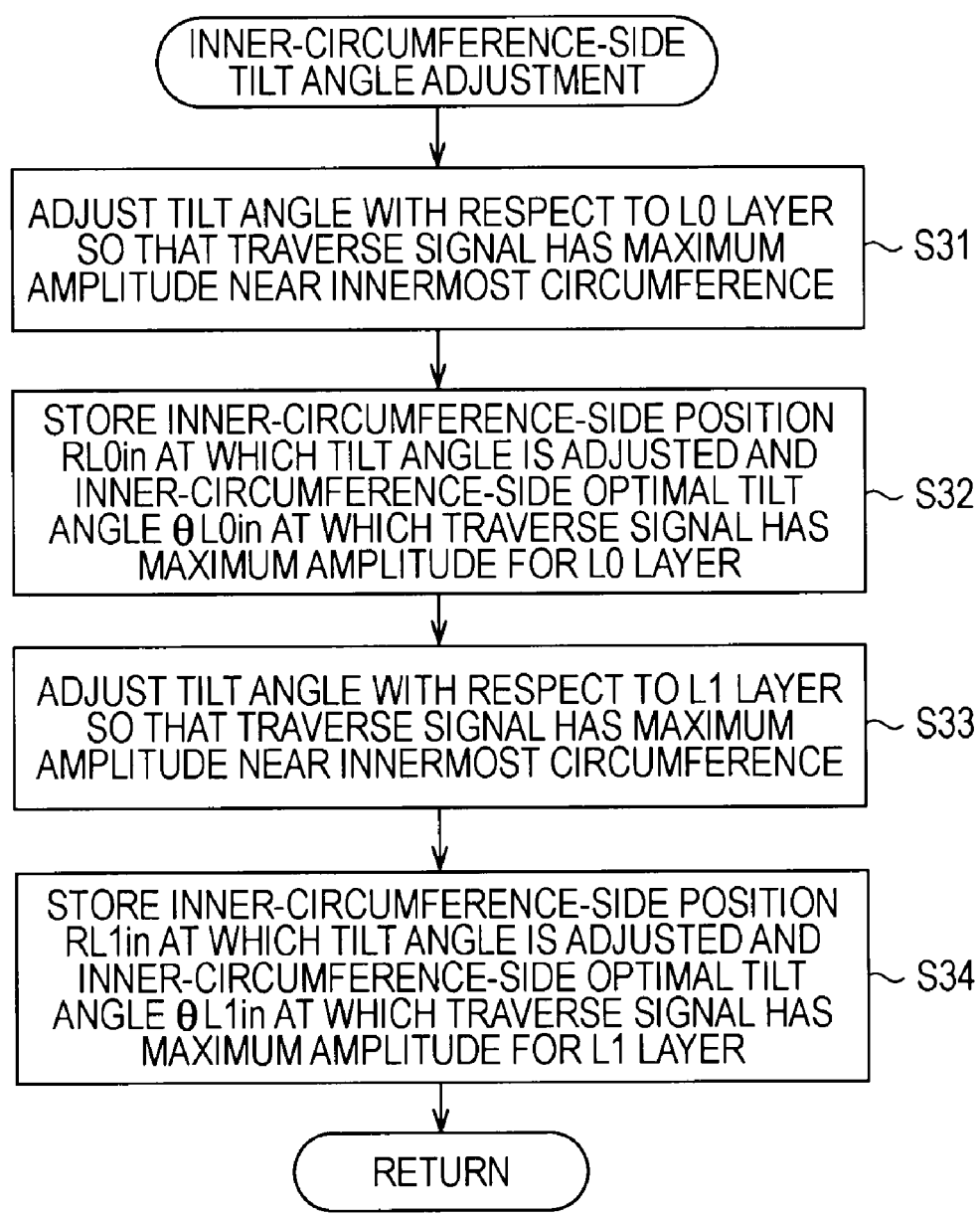
FIG. 6 is a flowchart showing an example of an inner-circumference-side tilt angle adjustment process.

FIG. 6 is a flowchart showing an example of the inner-circumference-side tilt angle adjustment process in Step S15 in FIG. 5.

In the inner-circumference-side tilt angle adjustment process, in Step S31, the system controller 10 adjusts the tilt angle of the pickup 3 with respect to the "L0" layer of the optical disk 1, which is the two-layer BD, to multiple values near the innermost circumference of the optical disk 1 to detect (calculate) the inner-circumference-side optimal tilt angle at which the amplitude of the traverse signal supplied from the level detector 9 is maximized.

In Step S32, the system controller 10 stores a set (RL0in, θL0in) of an inner-circumference-side position RL0in and an inner-circumference-side optimal tilt angle θL0in with respect to the "L0" layer in the memory 22 as information about the inner-circumference-side optimal tilt angle with respect to the "L0" layer. The inner-circumference-side position RL0in is a position in the radial direction of the optical disk 1 at which the inner-circumference-side optimal tilt angle is detected.

In Step S33, the system controller 10 adjusts the tilt angle of the pickup 3 with respect to the "L1" layer of the optical disk 1 to multiple values near the innermost circumference of the optical disk 1 to detect the inner-circumference-side optimal tilt angle at which the amplitude of the traverse signal supplied from the level detector 9 is maximized.

In Step S34, the system controller 10 stores a set (RL1in, θL1in) of an inner-circumference-side position RL1in and an inner-circumference-side optimal tilt angle θL1in with respect to the "L1" layer in the memory 22 as information about the inner-circumference-side optimal tilt angle with respect to the "L1" layer and the inner-circumference-side tilt angle adjustment process is terminated. The inner-circumference-side position RL1in is a position in the radial direction of the optical disk 1 at which the inner-circumference-side optimal tilt angle is detected.

FIG. 7 is a flowchart showing an example of the outer-circumference-side tilt angle adjustment process in Step S23 in FIG. 5.

In the outer-circumference-side tilt angle adjustment process, in Step S41, the system controller 10 adjusts the tilt angle of the pickup 3 with respect to the "L0" layer of the optical disk 1, which is the two-layer BD, to multiple values near the outermost circumference of the optical disk 1 to detect the outer-circumference-side optimal tilt angle at which the amplitude of the traverse signal supplied from the level detector 9 is maximized.

In Step S42, the system controller 10 stores a set (RL0out, θL0out) of an outer-circumference-side position RL0out and an outer-circumference-side optimal tilt angle θL0out with respect to the "L0" layer in the memory 22 as information about the outer-circumference-side optimal tilt angle with respect to the "L0" layer. The outer-circumference-side position RL0out is a position in the radial direction of the optical disk 1 at which the outer-circumference-side optimal tilt angle is detected.

In Step S43, the system controller 10 adjusts the tilt angle of the pickup 3 with respect to the "L1" layer of the optical disk 1 to multiple values near the outermost circumference of the optical disk 1 to detect the outer-circumference-side optimal tilt angle at which the amplitude of the traverse signal supplied from the level detector 9 is maximized.

In Step S44, the system controller 10 stores a set (RL1out, θL1out) of an outer-circumference-side position RL1out and an outer-circumference-side optimal tilt angle θL1out with respect to the "L1" layer in the memory 22 as information about the outer-circumference-side optimal tilt angle with respect to the "L1" layer and the outer-circumference-side tilt angle adjustment process is terminated. The outer-circumference-side position RL1out is a position in the radial direction of the optical disk 1 at which the outer-circumference-side optimal tilt angle is detected.

In the recording of data on the optical disk 1 and playback of data on the optical disk 1, the tilt angle controller 4 controls the tilt angle of the pickup 3 (performs the tilt angle control for the pickup 3) with respect to each of the "L0" and "L1" layers in the startup process in accordance with the information (RL0in, θL0in) about the inner-circumference-side optimal tilt angle with respect to the "L0" layer, the information (RL0out, θL0out) about the outer-circumference-side optimal tilt angle with respect to the "L0" layer, the information (RL1in, θL1in) about the inner-circumference-side optimal tilt angle with respect to the "L1" layer, and the information (RL1out, θL1out) about the outer-circumference-side optimal tilt angle with respect to the "L1" layer, which are stored in the memory 22.

Specifically, if data is recorded on the "L0" layer or data on the "L0" layer is played back when the thread controller 7 seeks the pickup 3 at a certain position R in the radial direction of the optical disk 1, the system controller 10 calculates the optimal tilt angle at the position R by the interpolation by using the information (RL0in, θL0in) about the inner-circumference-side optimal tilt angle with respect to the "L0" layer and the information (RL0out, θL0out) about the outer-circumference-side optimal tilt angle with respect to the "L0" layer and supplies the calculated optimal tilt angle to the tilt angle controller 4. The tilt angle controller 4 performs the tilt angle control so that the tilt angle of the pickup 3 is equal to the optimal tilt angle supplied from the system controller 10.

If data is recorded on the "L1" layer or data on the "L1" layer is played back when the thread controller 7 seeks the pickup 3 at the position R in the radial direction of the optical disk 1, the system controller 10 calculates the optimal tilt angle at the position R by the interpolation by using the information (RL1in, θL1in) about the inner-circumference-side optimal tilt angle with respect to the "L1" layer and the information (RL1out, θL1out) about the outer-circumference-side optimal tilt angle with respect to the "L1" layer and supplies the calculated optimal tilt angle to the tilt angle controller 4. The tilt angle controller 4 performs the tilt angle control so that the tilt angle of the pickup 3 is equal to the optimal tilt angle supplied from the system controller 10.

Figure 8A:
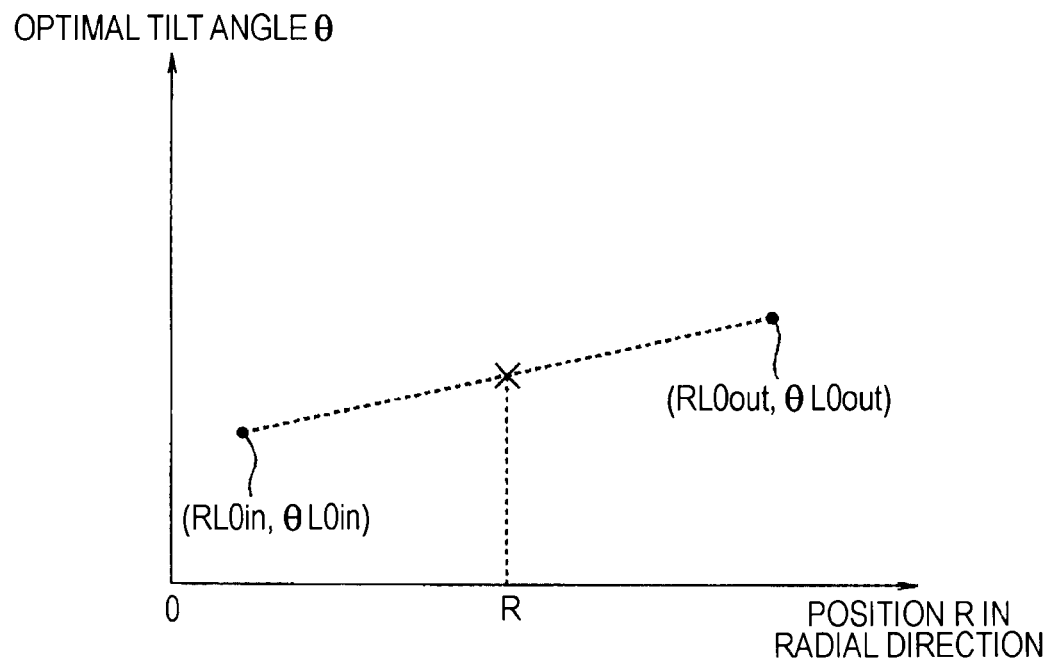
FIGS. 8A and 8B are diagrams for description of how to determine an optimal tilt angle at a position on an optical disk.
Figure 8B:
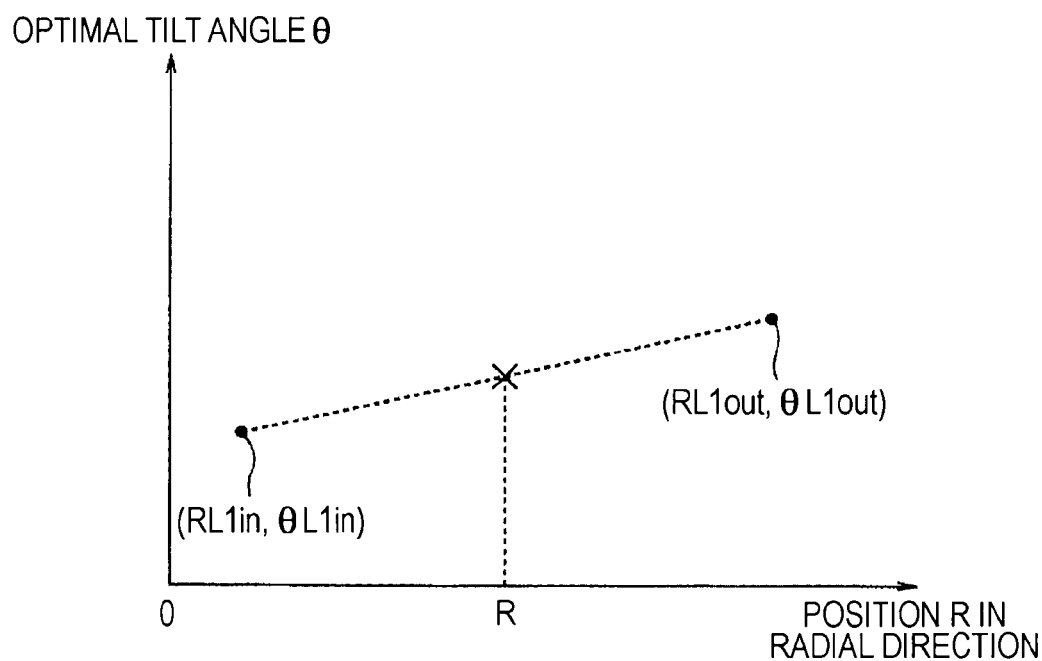

FIGS. 8A and 8B are diagrams for description of how to determine the optimal tilt angle at the position R on the optical disk 1 by the interpolation by the system controller 10.

When data is recorded on the "L0" layer or data on the "L0" layer is played back, the system controller 10 determines the optimal tilt angle at the position R by linear interpolation by using the information (RL0in, θL0in) about the inner-circumference-side optimal tilt angle with respect to the "L0" layer and the information (RL0out, θL0out) about the outer-circumference-side optimal tilt angle with respect to the "L0" layer, as shown in FIG. 8A.

When data is recorded on the "L1" layer or data on the "L1" layer is played back, the system controller 10 determines the optimal tilt angle at the position R by the linear interpolation by using the information (RL1in, θL1in) about the inner-circumference-side optimal tilt angle with respect to the "L1" layer and the information (RL1out, θL1out) about the outer-circumference-side optimal tilt angle with respect to the "L1" layer, as shown in FIG. 8B.

As described above with reference to FIGS. 6 and 7, in the optical disk apparatus shown in FIG. 1, the tilt angle is adjusted with respect to each of the "L0" and "L1" layers of the optical disk 1, which is the two-layer BD having the two recording layers: the "L0" layer and the "L1" layer on one side, to detect the optimal tilt angle. The optimal tilt angle detected for the "L0" layer is used to perform the tilt angle control in the recording of data on the "L0" layer and playback of data on the "L0" layer, and the optimal tilt angle detected for the "L1" layer is used to perform the tilt angle control in the recording of data on the "L1" layer and playback of data on the "L1" layer. Accordingly, it is possible to perform the normal playback or recording on both the "L0" layer and the "L1" layer.

The steps describing the programs causing the computer (the CPU 21) to perform the variety of processing may not necessarily be executed in time series in the order described in the flowcharts and may be executed in parallel or individually (for example, may include parallel processing or object processing).

The programs may be executed by one computer or may be subjected to distributed processing by multiple computers.

It should be understood by those skilled in the art that various modifications, combinations, sub-combinations and alterations may occur depending on design requirements and other factors insofar as they are within the scope of the appended claims or the equivalents thereof.

Specifically, the present invention is applicable to an optical disk having three or more recording layers, in addition to the optical disk having the two recording layers.

What is claimed is:

1. An optical disk apparatus driving an optical disk, the optical disk apparatus comprising:
    tilt-angle adjusting means for adjusting a tilt angle indicating the tilt of an optical axis of laser light emitted from a pickup to detect an optimal tilt angle at which a traverse signal has the maximum amplitude, the pickup irradiating the optical disk with the laser light and outputting a radio-frequency signal and a tracking error signal depending on reflected light of the laser light reflected from the optical disk, the traverse signal being the tracking error signal when tracking control is inactivated;
    storing means for storing information about the optimal tilt angle; and
    adjusting means for adjusting a focus bias used for correcting a focus error signal for controlling a focus of the laser light and an aberration correction value used for correcting spherical aberration of the pickup, wherein when the optical disk has a plurality of recording layers on one side, the tilt-angle adjusting means adjusts the tilt angle with respect to each of the plurality of recording layers to detect the optimal tilt angle and the storing means stores information about the optimal tilt angle with respect to each of the plurality of recording layers,
    the tilt angle with respect to each of the plurality of recording layers is controlled in accordance with the information about the optimal tilt angle with respect to each of the plurality of recording layers stored in the storing means, and
    the adjusting means adjusts the focus bias and the aberration correction value to traverse-maximized adjustment values at which the traverse signal has the maximum amplitude at a position toward an inner circumference of the optical disk and stores the adjusted focus bias and the aberration correction value.

2. The optical disk apparatus according to claim 1, wherein
    the tilt-angle adjusting means adjusts the tilt angle with respect to each of the plurality of recording layers at the position toward the inner circumference of the optical disk to detect the optimal tilt angle,
    the storing means stores the information about the optimal tilt angle with respect to each of the plurality of recording layers at the position toward the inner circumference of the optical disk,
    the adjusting means adjusts the focus bias and the aberration correction value to error-rate-minimized adjustment values at which data corresponding to the radio-frequency signal output from the pickup has the minimum error rate at the position toward the inner circumference of the optical disk and stores the adjusted focus bias and aberration correction value,
    the adjusting means adjusts the focus bias and the aberration correction value to the traverse-maximized adjustment values at a position toward an outer circumference of the optical disk after the pickup is moved to the position toward the outer circumference of the optical disk,
    the tilt-angle adjusting means adjusts the tilt angle with respect to each of the plurality of recording layers at the position toward the outer circumference of the optical disk to detect the optimal tilt angle,
    the storing means stores the information about the optimal tilt angle with respect to each of the plurality of recording layers at the position toward the outer circumference of the optical disk, and
    the adjusting means adjusts the focus bias and the aberration correction value to the error-rate-minimized adjustment values at the position toward the outer circumference of the optical disk.

3. The optical disk apparatus according to claim 1, further comprising:
    determining means for determining a type of the optical disk,
    wherein, when it is determined that the optical disk is a Blu-ray disk having two recording layers on one side, the tilt-angle adjusting means adjusts the tilt angle with respect to each of the two recording layers to detect the optimal tilt angle and the storing means stores information about the optimal tilt angle with respect to each of the two recording layers.

4. A method of controlling an optical disk apparatus that drives an optical disk, the method comprising:
    adjusting a tilt angle indicating the tilt of an optical axis of laser light emitted from a pickup to detect an optimal tilt angle at which a traverse signal has the maximum amplitude, the pickup irradiating the optical disk with the laser light and outputting a radio-frequency signal and a tracking error signal depending on reflected light of the laser light reflected from the optical disk, the traverse signal being the tracking error signal when tracking control is inactivated;

storing information about the optimal tilt angle in a memory; and adjusting a focus bias used for correcting a focus error signal for controlling a focus of the laser light and an aberration correction value used for correcting spherical aberration of the pickup, wherein, when the optical disk has a plurality of recording layers on one side, the adjusting adjusts the tilt angle with respect to each of the plurality of recording layers to detect the optimal tilt angle and the memory stores information about the optimal tilt angle with respect to each of the plurality of recording layers in the storing means, wherein the tilt angle with respect to each of the plurality of recording layers is controlled in accordance with the information about the optimal tilt angle with respect to each of the plurality of recording layers stored in the memory, and the adjusting a focus bias includes adjusting the focus bias and the aberration correction value to traverse-maximized adjustment values at which the traverse signal has the maximum amplitude at a position toward an inner circumference of the optical disk and stores the adjusted focus bias and the aberration correction value.

5. A non-transitory computer-readable medium including a computer-executable program, which when executed by a processor causes the processor to perform a method of controlling an optical disk apparatus driving an optical disk, the method comprising:

adjusting a tilt angle indicating the tilt of an optical axis of laser light emitted from a pickup to detect an optimal tilt angle at which a traverse signal has the maximum amplitude, the pickup irradiating the optical disk with the laser light and outputting a radio-frequency signal and a tracking error signal depending on reflected light of the laser light reflected from the optical disk, the traverse signal being the tracking error signal when tracking control is inactivated;

storing information about the optimal tilt angle in a memory; and adjusting a focus bias used for correcting a focus error signal for controlling a focus of the laser light and an aberration correction value used for correcting spherical aberration of the pickup, wherein when the optical disk has a plurality of recording layers on one side, the adjusting adjusts the tilt angle with respect to each of the plurality of recording layers to detect the optimal tilt angle and the memory stores information about the optimal tilt angle with respect to each of the plurality of recording layers, the tilt angle with respect to each of the plurality of recording layers is controlled in accordance with the information about the optimal tilt angle with respect to each of the plurality of recording layers stored in the memory, and the adjusting a focus bias includes adjusting the focus bias and the aberration correction value to traverse-maximized adjustment values at which the traverse signal has the maximum amplitude at a position toward an inner circumference of the optical disk and stores the adjusted focus bias and the aberration correction value.

6. An optical disk apparatus driving an optical disk, the optical disk apparatus comprising:

a tilt-angle controller that adjusts a tilt angle indicating the tilt of an optical axis of laser light emitted from a pickup to detect an optimal tilt angle at which a traverse signal has the maximum amplitude, the pickup irradiating the optical disk with the laser light and outputting a radio-frequency signal and a tracking error signal depending on reflected light of the laser light reflected from the optical disk, the traverse signal being the tracking error signal when tracking control is inactivated;

a focus controller that adjusts a focus bias used for correcting a focus error signal for controlling a focus of the laser light;

an spherical aberration correction controller that adjusts an aberration correction value used for correcting spherical aberration of the pickup; and a memory that stores information about the optimal tilt angle, wherein when the optical disk has a plurality of recording layers on one side, the tilt-angle controller adjusts the tilt angle with respect to each of the plurality of recording layers to detect the optimal tilt angle and the memory stores information about the optimal tilt angle with respect to each of the plurality of recording layers, the tilt angle with respect to each of the plurality of recording layers is controlled in accordance with the information about the optimal tilt angle with respect to each of the plurality of recording layers stored in the memory, and the focus controller adjusts the focus bias and the spherical aberration controller adjusts the aberration correction value to traverse-maximized adjustment values at which the traverse signal has the maximum amplitude at a position toward an inner circumference of the optical disk and stores the adjusted focus bias and the aberration correction value.

7. The optical disk apparatus according to claim 6, wherein the tilt-angle controller adjusts the tilt angle with respect to each of the plurality of recording layers at the position toward the inner circumference of the optical disk to detect the optimal tilt angle.

8. The optical disk apparatus according to claim 7, wherein the memory stores the information about the optimal tilt angle with respect to each of the plurality of recording layers at the position toward the inner circumference of the optical disk.

9. The optical disk apparatus according to claim 8, wherein the focus controller adjusts the focus bias and the spherical aberration correction controller adjusts the aberration correction value to error-rate-minimized adjustment values at which data corresponding to the radio-frequency signal output from the pickup has the minimum error rate at the position toward the inner circumference of the optical disk and stores the adjusted focus bias and aberration correction value.

10. The optical disk apparatus according to claim 6, wherein the focus controller adjusts the focus bias and the spherical aberration correction controller adjusts the aberration correction value to the traverse-maximized adjustment values at a position toward an outer circumference of the optical disk after the pickup is moved to the position toward the outer circumference of the optical disk.

11. The optical disk apparatus according to claim 10, wherein the tilt-angle controller adjusts the tilt angle with respect to each of the plurality of recording layers at the position toward the outer circumference of the optical disk to detect the optimal tilt angle.

12. The optical disk apparatus according to claim 11, wherein the memory stores the information about the optimal tilt angle with respect to each of the plurality of recording layers at the position toward the outer circumference of the optical disk.

13. The optical disk apparatus according to claim 12, wherein the focus controller adjusts the focus bias and the spherical aberration correction controller adjusts the aberration correction value to the error-rate-minimized adjustment values at the position toward the outer circumference of the optical disk.

* * * * *